United States Patent
Hirakata et al.

(10) Patent No.: US 7,440,068 B2
(45) Date of Patent: *Oct. 21, 2008

(54) ELECTRONIC APPARATUS WITH A FLEXIBLE PRINTED CIRCUIT AND A TRANSPARENT CONDUCTIVE LAYER

(75) Inventors: Yoshiharu Hirakata, Kanagawa (JP); Shunpei Yamazaki, Tokyo (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/837,588

(22) Filed: Aug. 13, 2007

(65) Prior Publication Data

US 2007/0291211 A1      Dec. 20, 2007

Related U.S. Application Data

(63) Continuation of application No. 10/384,943, filed on Mar. 10, 2003, now Pat. No. 7,268,851, which is a continuation of application No. 09/865,081, filed on May 24, 2001, now Pat. No. 6,567,146, which is a continuation of application No. 09/481,278, filed on Jan. 11, 2000, now Pat. No. 6,239,854, which is a continuation of application No. 09/165,628, filed on Oct. 1, 1998, now Pat. No. 6,072,556.

(30) Foreign Application Priority Data

Oct. 6, 1997    (JP)    ................... 9-289160

(51) Int. Cl.
G02F 1/1345    (2006.01)
G02F 1/1339    (2006.01)

(52) U.S. Cl. .................. 349/149; 349/152; 349/153
(58) Field of Classification Search ............... 349/149, 349/152, 153, 139, 143
See application file for complete search history.

(56) References Cited

U.S. PATENT DOCUMENTS

| 5,148,301 A | 9/1992 | Sawatsubashi et al. |
| 5,179,460 A | 1/1993 | Hinata et al. |
| 5,187,604 A | 2/1993 | Taniguchi et al. |
| 5,323,042 A | 6/1994 | Matsumoto |
| 5,396,356 A | 3/1995 | Fukuchi |

(Continued)

FOREIGN PATENT DOCUMENTS

JP    6-138488    5/1994

(Continued)

*Primary Examiner*—Mike Qi
(74) *Attorney, Agent, or Firm*—Cook Alex Ltd.

(57) ABSTRACT

A height difference under a sealant is reduced in a case where lines are present under the sealant. There is provided a substrate having an active matrix display circuit and peripheral driving circuits, a counter substrate having a counter electrode provided on the substrate in a face-to-face relationship therewith, a sealant provided between the substrate and the counter substrate such that it surrounds the active matrix display circuit and peripheral driving circuits, a liquid crystal material provided inside the sealant, a plurality of external connection lines provided on the substrate under the sealant with a resin inter-layer film interposed therebetween for electrically connecting the active matrix display circuit and peripheral driving circuits to circuits present outside the sealant and an adjustment layer provided in the same layer as the plurality of external connection lines.

26 Claims, 9 Drawing Sheets

U.S. PATENT DOCUMENTS

| | | | |
|---|---|---|---|
| 5,432,626 A | 7/1995 | Sasuga et al. | |
| 5,483,082 A | 1/1996 | Takizawa et al. | |
| 5,517,344 A | 5/1996 | Hu et al. | |
| 5,572,046 A | 11/1996 | Takemura | |
| 5,596,023 A | 1/1997 | Tsubota et al. | |
| 5,598,283 A | 1/1997 | Fujii et al. | |
| 5,619,358 A | 4/1997 | Tanaka et al. | |
| 5,621,553 A | 4/1997 | Nishiguchi et al. | |
| 5,684,547 A | 11/1997 | Park et al. | |
| 5,684,555 A | 11/1997 | Shiba et al. | |
| 5,706,069 A | 1/1998 | Hermens et al. | |
| 5,745,208 A | 4/1998 | Grupp et al. | |
| 5,770,349 A | 6/1998 | Suginoya et al. | |
| 5,798,812 A | 8/1998 | Nishiki et al. | |
| 5,929,959 A | 7/1999 | Iida et al. | |
| 5,936,693 A | 8/1999 | Yoshida et al. | |
| 5,995,189 A | 11/1999 | Zhang | |
| 6,011,607 A | 1/2000 | Yamazaki et al. | |
| 6,037,005 A | 3/2000 | Moshrefzadeh et al. | |
| 6,055,034 A | 4/2000 | Zhang et al. | |
| 6,072,556 A | 6/2000 | Hirakata et al. | |
| 6,088,070 A | 7/2000 | Ohtani et al. | |
| 6,115,097 A | 9/2000 | Yamazaki | |
| 6,122,030 A | 9/2000 | Nagata et al. | |
| 6,124,604 A | 9/2000 | Koyama et al. | |
| 6,124,917 A | 9/2000 | Fujioka et al. | |
| 6,198,517 B1 | 3/2001 | Ohori et al. | |
| 6,239,854 B1 | 5/2001 | Hirakata et al. | |
| 6,335,716 B1 | 1/2002 | Yamazaki et al. | |
| 6,567,146 B2 | 5/2003 | Hirakata et al. | |
| 6,630,687 B1 | 10/2003 | Koyama et al. | |
| 7,268,851 B2 * | 9/2007 | Hirakata et al. | 349/139 |
| 2004/0084675 A1 | 5/2004 | Koyama et al. | |

FOREIGN PATENT DOCUMENTS

| | | |
|---|---|---|
| JP | 6-250221 | 9/1994 |
| JP | 10-198292 | 7/1998 |

* cited by examiner

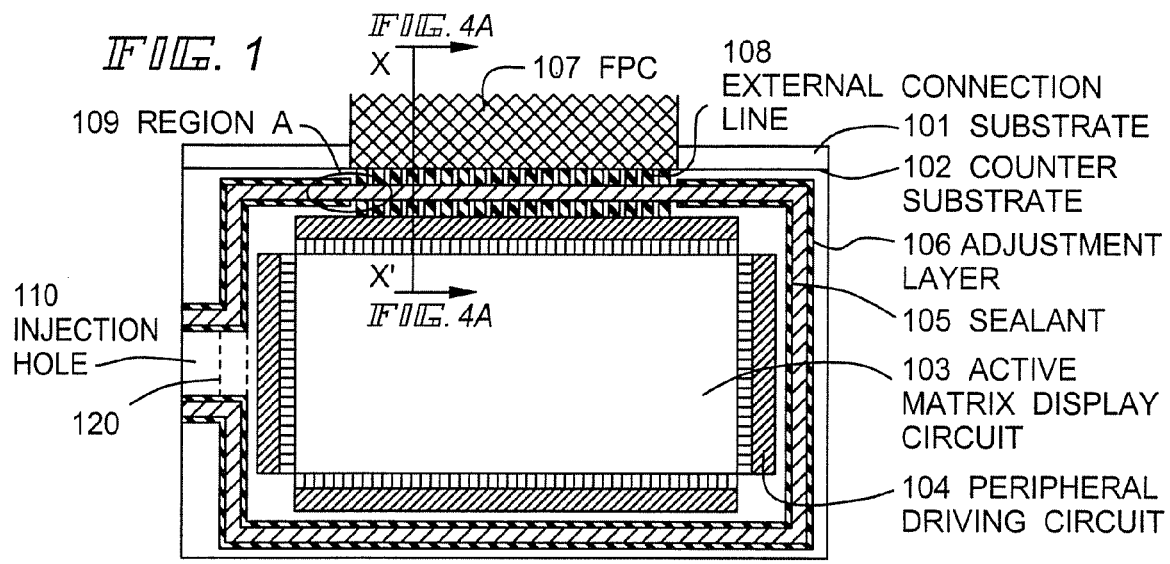
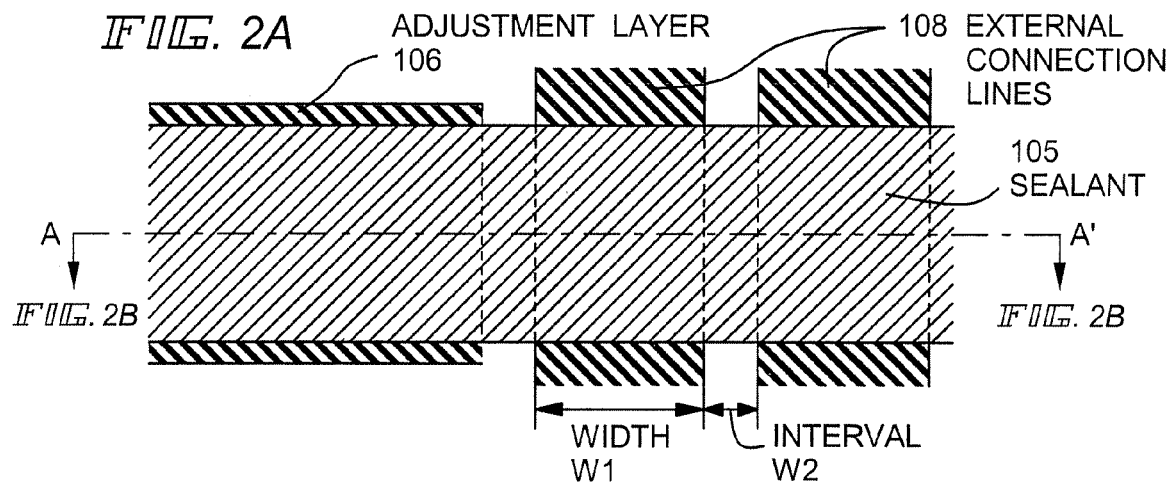
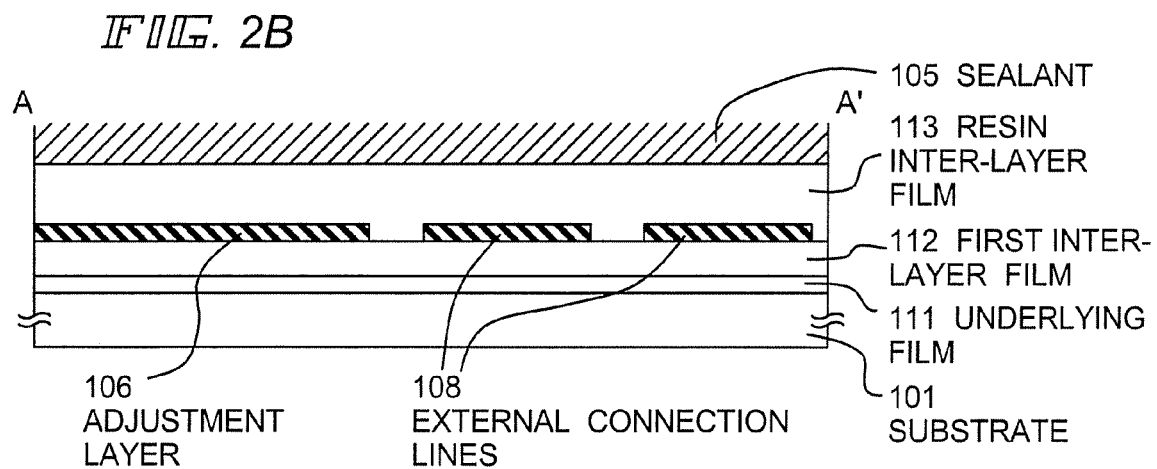

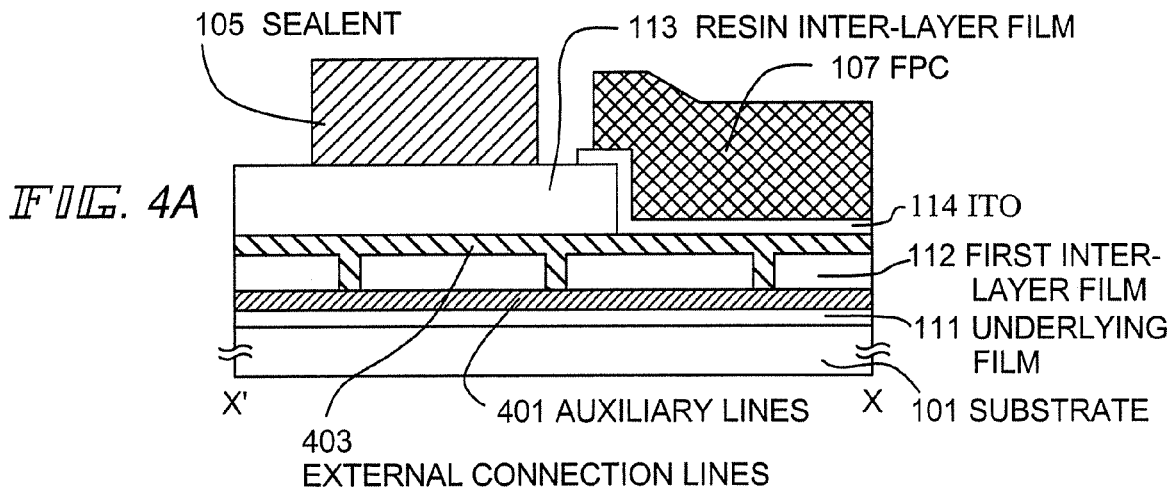
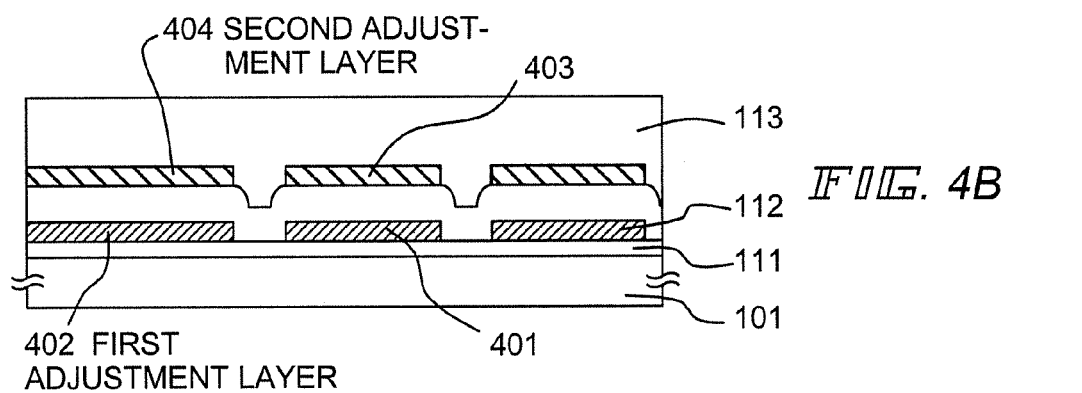
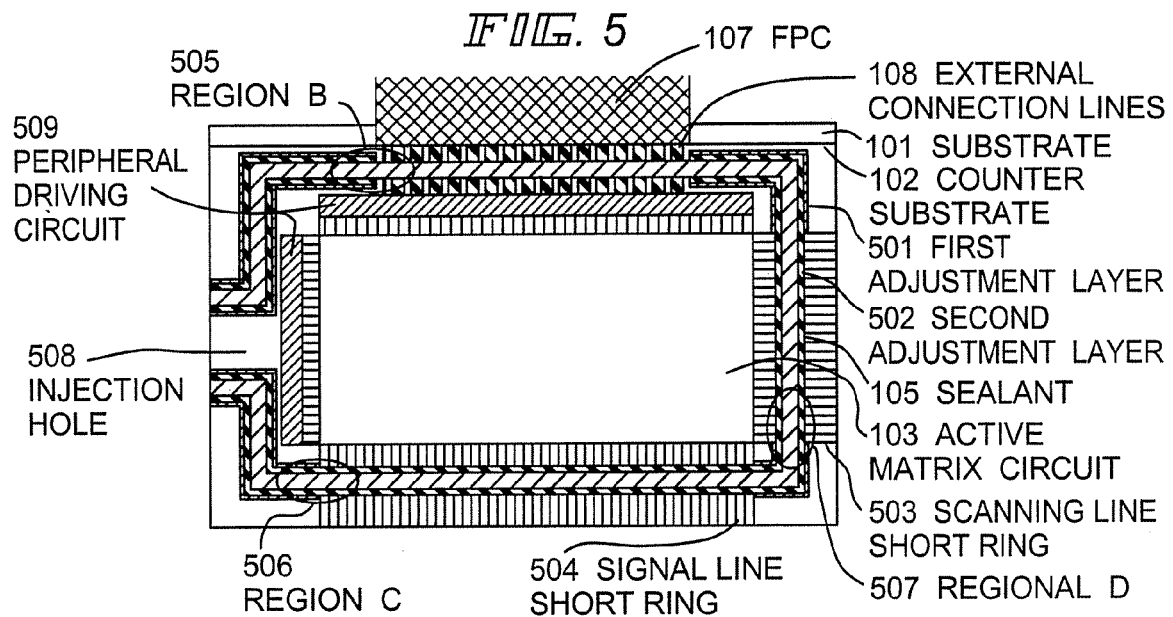

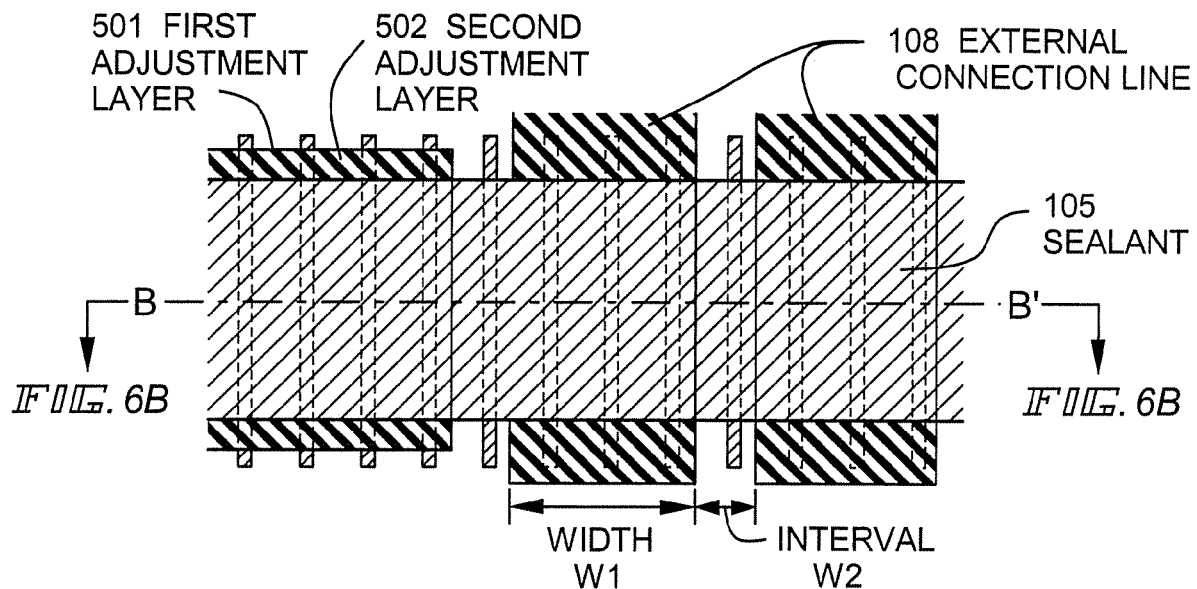
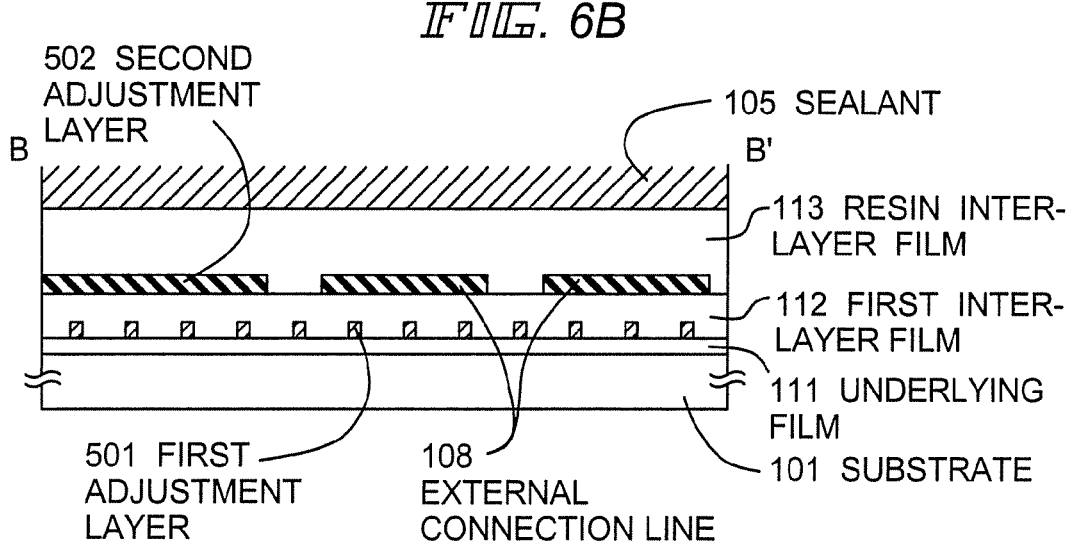

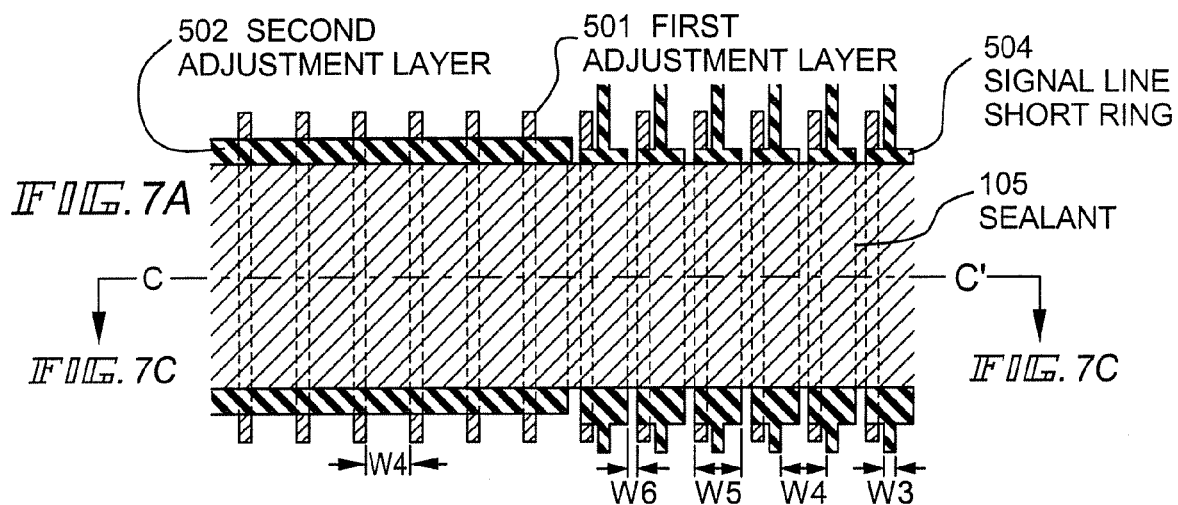
FIG. 7A
FIG. 7B
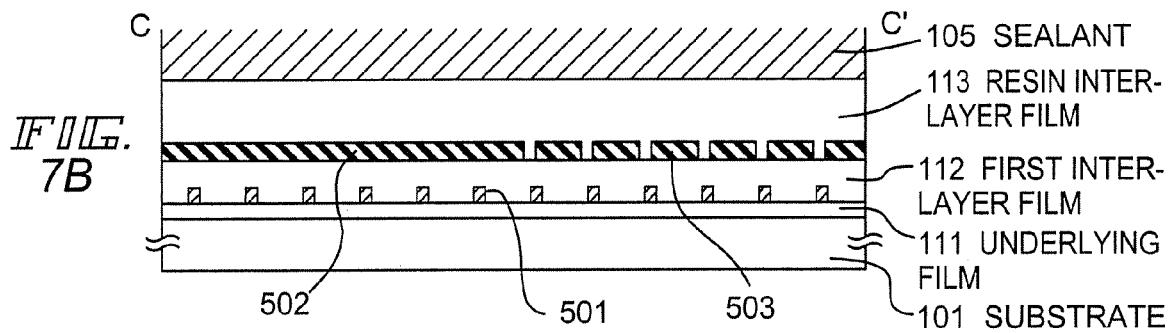
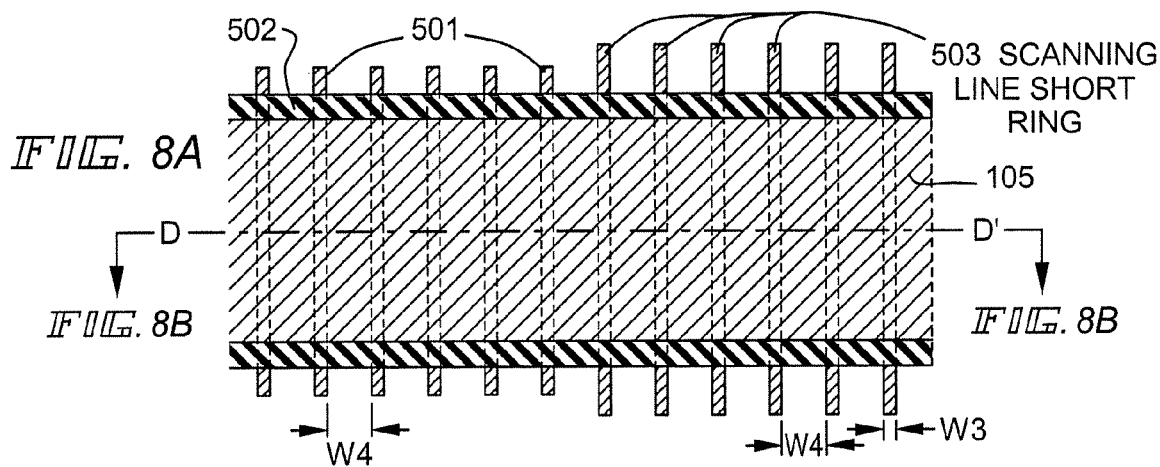
FIG. 8A
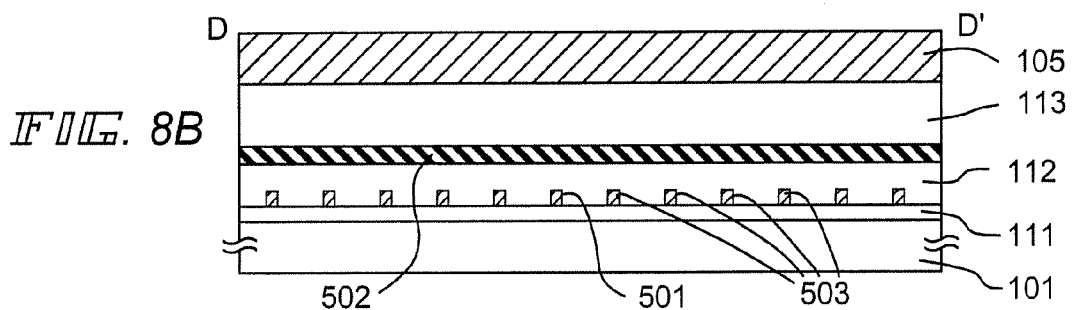
FIG. 8B

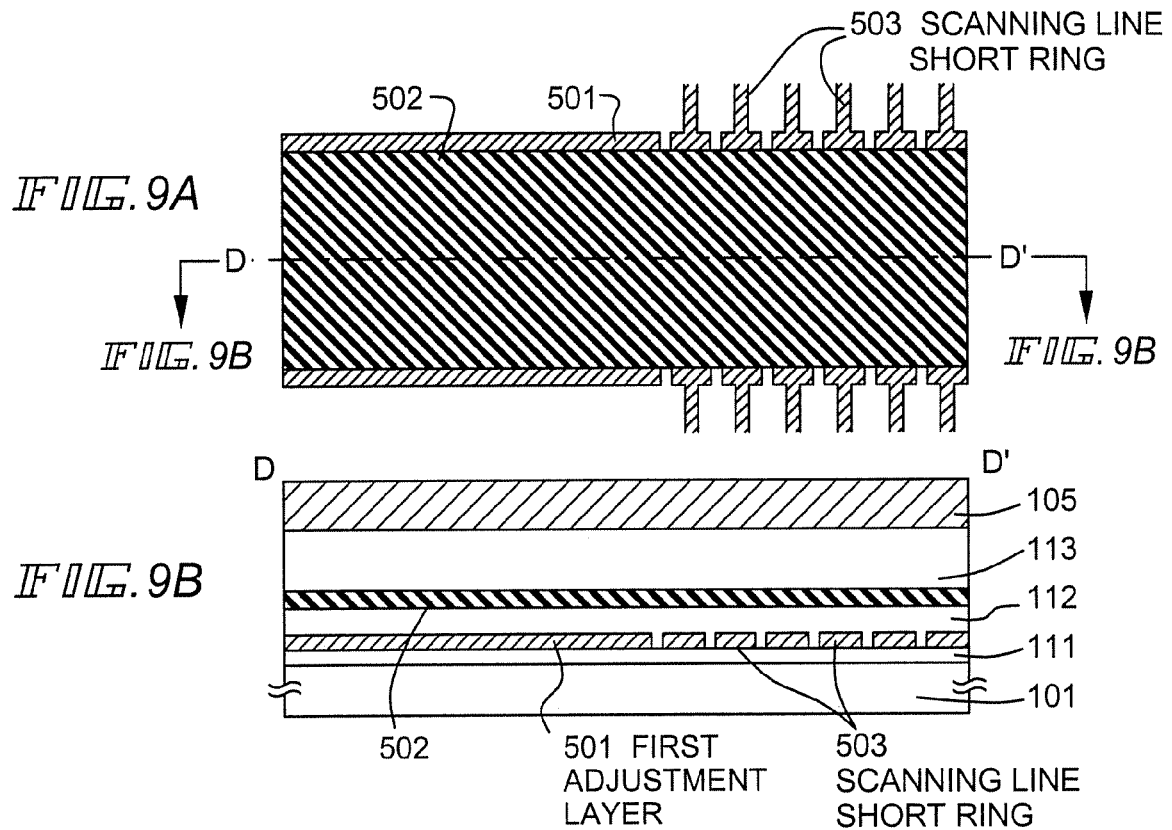
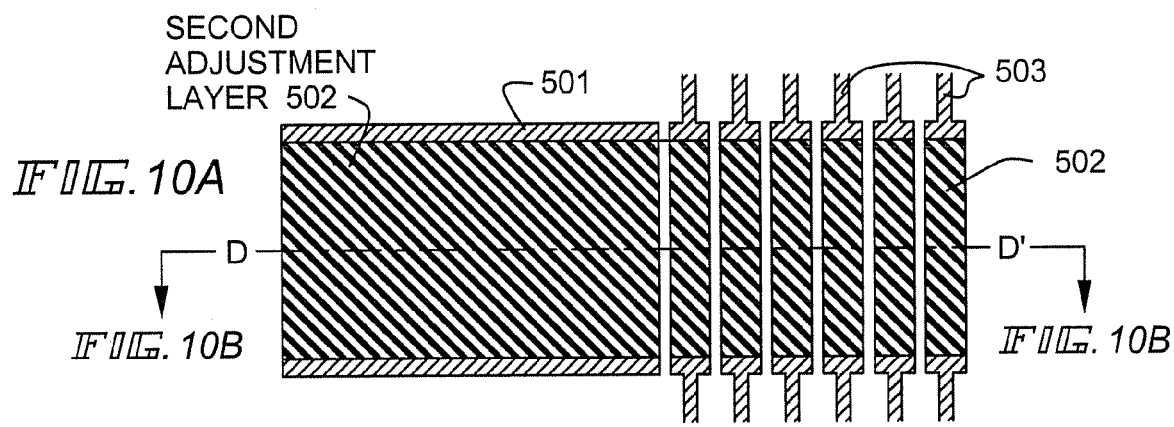
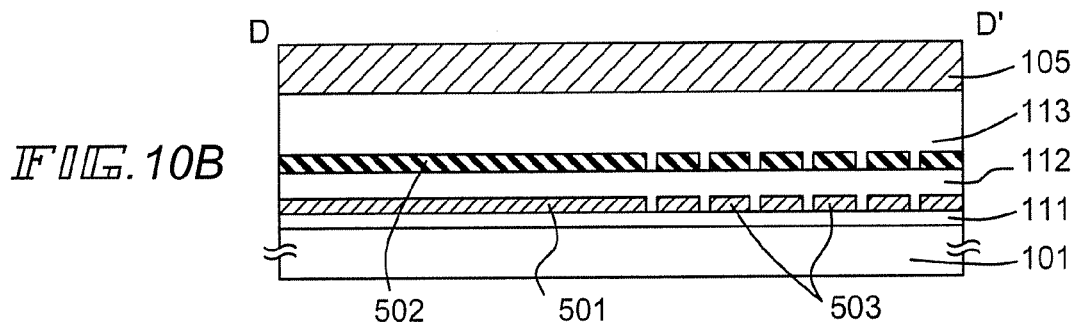

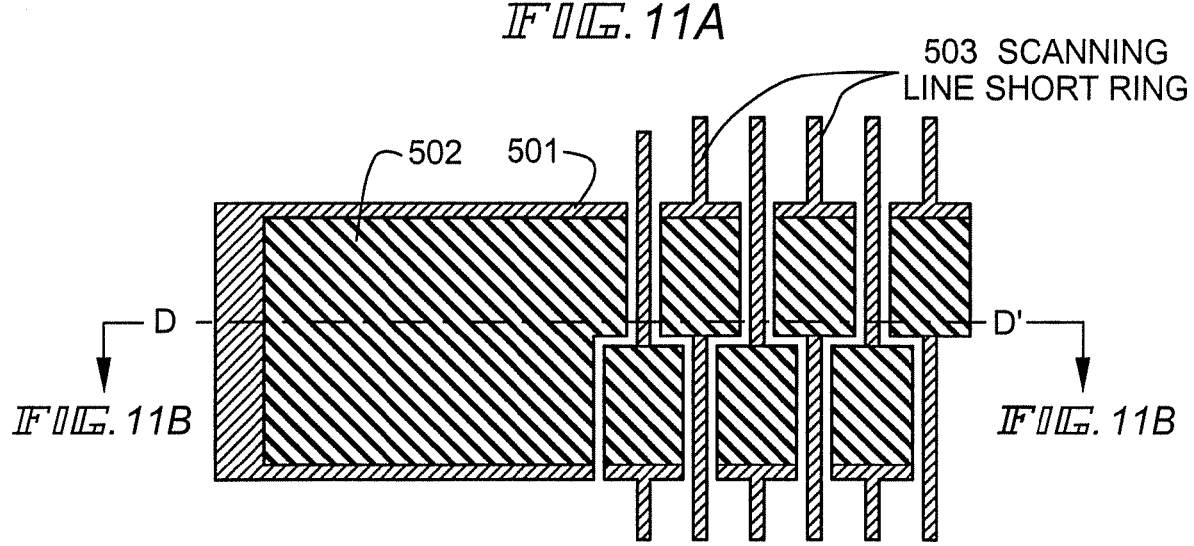
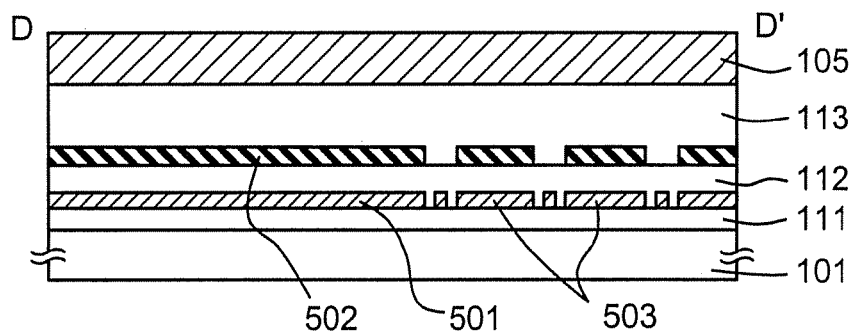
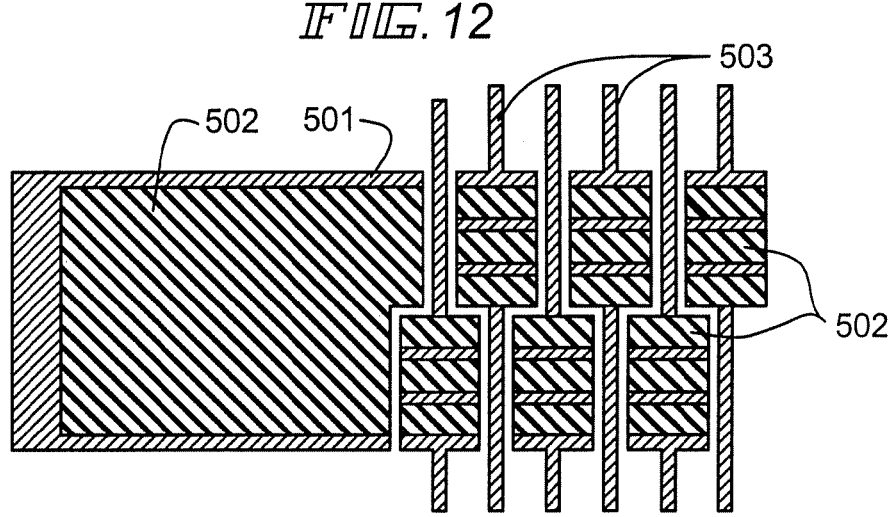

ELECTRONIC APPARATUS WITH A FLEXIBLE PRINTED CIRCUIT AND A TRANSPARENT CONDUCTIVE LAYER

This application is a continuation of U.S. application Ser. No. 10/384,943, filed on Mar. 10, 2003 now U.S. Pat. No. 7,268,851 which is a continuation of U.S. application Serial No. 09/865,081 filed on May 24, 2001 (now U.S. Pat. No. 6,567,146 issued on May 20, 2003) which is a continuation of U.S. application Ser. No. 09/481,278, filed on Jan. 11,2000 (now U.S. Pat. No. 6,239,854 issued on May 29, 2001) which is a continuation of U.S. application Ser. No. 09/165,628, filed on Oct. 1, 1998 (now U.S. Pat. No. 6,072,556 issued on Jun. 6, 2000).

The present invention relates to a structure of a liquid crystal display device integral with peripheral circuits in which an active matrix display circuit and peripheral driving circuits are provided on the same substrate.

More particularly, the present invention relates to a configuration in which peripheral driving circuits are provided inside a region enclosed by a sealant for sealing a liquid crystal material.

There are configurations of liquid crystal display devices integral with peripheral circuits having an active matrix circuit and peripheral driving circuits provided on the same substrate in which peripheral driving circuits are provided inside a region enclosed by a sealant for sealing the liquid crystal material. A CPU, a memory, a control circuit and the like may be provided in addition to peripheral driving circuits.

In such a device, lines are provided under the region where the sealant is provided (hereinafter referred to as "sealant region"). For example, such lines include external connection lines for transmitting signals between the outside and inside of the sealant and short rings formed by extending scanning lines and signal lines and shorting them outside the sealant region in order to prevent electrostatic breakdown of TFTs (thin film transistors) forming an active matrix display circuit at manufacturing steps.

The lines provided under the sealant region results in different heights in the sealant. Such a height difference is primarily caused by two reasons.

One reason is that the lines under the sealant region are localized and are not present in some locations.

The other reason is that the line width and line intervals of the lines under the sealant region vary.

FIG. 13 shows an example of a liquid crystal display device integral with peripheral driving circuits. Referring to FIG. 13, a substrate 1501 and a counter substrate 1502 are disposed in a face-to-face relationship with a sealant 1505 having an injection hole 1510 interposed therebetween to form a panel. On the substrate 1501, there is provided an active matrix display circuit 1503, peripheral driving circuits such as shift registers and decoders for driving the circuit 1503 and external connection lines 1508 for electrically connecting those circuits and circuits outside the sealant to transmit signals therebetween.

The external connection lines 1508 are connected to the external circuits through an FPC (flexible printed circuit).

There is further provided short rings 1509 which are formed by extending scanning lines and signal lines. The short rings 1509 are formed to short those lines with each other outside the sealant region to prevent electrostatic breakdown of TFTs (thin film transistors) forming the active matrix display circuit at manufacturing steps. The configuration of the short rings 1509 shown in FIG. 13 is a configuration for multi-shot manufacture in which a plurality of panels are obtained from a single substrate. Although not shown in FIG. 13, the short rings are electrically connected to the short rings of an adjacent panel to short the scanning lines and signal lines, and the short rings are separated when the substrate is separated into independent panels as shown in FIG. 13.

FIG. 14A shows sections of a region under the sealant 1505 where the external connection lines 1508 are provided and a region where no line is provided. Referring to FIG. 14A, provided on the substrate 1501 are an underlying film 1511 such as a silicon oxide film, a first inter-layer film 1512 formed by a silicon oxide film, a silicon nitride film or a multi-layer film consisting of them, external connection lines 1508 and a resin inter-layer film 1513 made of resin such as polyimide or acrylic.

The external connection lines 1508 are formed by a metal film, e.g., an aluminum film, in the range from about 200 nm to 700 nm. Although dependent on the, application, the external connection lines 1508 are formed by a plurality of lines each having a width in the range from 50 μm to 300 μm provided as a group at intervals in the range from 30 μm to 100 μm.

In such a configuration, the resin inter-layer film 1513 has a thickness of about 1 μm and is provided in order to achieve flatness. However, regions of the resin inter-layer film 1513 having the external connection lines 1508 is higher than regions having no line by a height difference d. Such a step can be in the range from a few hundred nm to 500 nm, although it is smaller than the height (thickness) of the external connection lines 1508.

FIG. 14B shows a sectional view of a region under the sealant 1505 where the short rings 1509 are provided in the same layer and using the same material as those of the external connection lines 1508. Therefore, the thickness (height) of the short rings 1509 is the same as that of the external connection lines 1508. The short rings are extensions of signal lines and scanning lines. They are a plurality of lines each having a width in the range from 2 μm to 10 μm provided as a group at intervals in the range from 20 μm to 100 μm.

There is a height difference d2 between the region where the short rings 1509 are provided and the region where the external connection lines 1508 are provided. This height difference can be also in an approximate range from a few hundred nm to 500 nm. Especially, the height difference is increased when a plurality of the resin inter-layer films are formed. A step on the order of 1000 nm may be formed when the films are stacked to a thickness on the order of 2 μm.

A step can be formed on the resin inter-layer film also between the region having the short rings 1509 and the region having no line.

The substrate having the active matrix display circuit provided thereon and the counter circuit are provided in a face-to-face relationship with a sealant including spacers (spherical or cylindrical microscopic particles for maintaining an interval between the substrates) interposed therebetween. Therefore, any uneven height difference in the sealant region where the sealant is provided causes distortion of the counter substrate such as flexing and twisting to make the substrate interval uneven. As a result, a uniform state of display can not be achieved in a single screen and there will be unevenness in color and brightness.

The problem of the distortion of the substrate does not occur even in the presence of a height difference under the sealant region if the height difference is uniformly distributed under the sealant region. However, since the lines extending across the sealant region are provided as a group of lines which are locally concentrated, in general, such a height difference is not uniformly distributed under the sealant region. This results in distortion of the substrate as described above.

The allowance (the range in which no uneven display occurs) for the height difference under the sealant region is on the order of only 1000 nm for a TN (twisted nematic) type liquid crystal display. Especially, for an ECB (electrically controlled multi-reflectivity) mode utilizing nematic liquid crystal, a height difference of only 200 nm causes distortion of the substrate which leads to uneven display and color variation. For example, a height difference of 200 nm between the external connection lines and the short rings makes the substrate interval in the vicinity of the short rings smaller than that in the vicinity of the external connection lines, thereby causing distortion of the substrate and uneven display. Therefore, it is quite important for a liquid crystal display device to have a small height difference under the sealant region in order to provide uniform display in one screen.

It is an object of the present invention to reduce a height difference under a sealant region where wiring is provided under the sealant region (sealant).

Especially, it is an object of the present invention to reduce a height difference under a sealant region in a configuration wherein wiring is provided under the sealant region and one or more inter-layer films made of a resin material are provided on the wiring.

It is another object of the present invention to reduce a height difference under the sealant region in a configuration wherein lines having different widths are provided under the sealant region and wherein one or more inter-layer films made of a resin material are provided above those lines.

According to the present invention, a liquid crystal display device comprises:

a first substrate having a active matrix circuit and peripheral driving circuits provided thereon;

a counter substrate having a counter electrode provided in a face-to-face relationship with the substrate;

a sealant provided between the first substrate and the counter substrate such that it surrounds the active matrix circuit and peripheral driving circuits;

a liquid crystal material provided inside the sealant;

a plurality of external connection lines provided on the first substrate under the sealant with a resin inter-layer film interposed therebetween for electrically connecting the active matrix display circuit and peripheral driving circuits to circuits present outside the sealant; and an adjustment layer provided in the same layer as the plurality of external connection lines.

In the above-described configuration, the adjustment layer may be provided with the same thickness as that of the plurality of external connection lines.

In either of the above-described configurations, the adjustment layer may be provided with the same intervals and width as those of the plurality of external connection lines.

In any of the above-described configurations, at least one of the plurality of external connection lines may be electrically connected in parallel to one of a plurality of auxiliary lines provided in a layer different from that of the external connection lines to reduce electrical resistance, and an adjustment layer may be provided in the same layer as the auxiliary lines.

A plurality of lines extending across the sealant thereunder and having a smaller width than that of each of the plurality of external connection lines and intervals greater than the width may be provided in a layer different from that of the plurality of external connection lines, and the plurality of lines may include extensions from scanning lines and signal lines that form the active matrix display circuit.

Further, a plurality of lines extending across the sealant thereunder and having a smaller width than that of each of the plurality of external connection lines and intervals greater than the width may be provided in the same layer as that of the plurality of external connection lines, and the plurality of lines may include extensions from scanning lines and signal lines that form the active matrix display circuit. The plurality of lines may include a portion under the sealant where the width is increased.

In the configuration in which at least one of the plurality of external connection lines is electrically connected in parallel to one of a plurality of auxiliary lines provided in a layer different from that of the plurality of external connection lines to reduce electrical resistance and in which an adjustment layer is provided in the same layer as the auxiliary lines:

a plurality of first lines having a width smaller than that of each of the plurality of auxiliary lines may be provided at intervals greater than the width in the same layer as the auxiliary lines such that they extend across the sealant thereunder;

the plurality of first lines may include extensions of either the scanning lines or signal lines forming the active matrix display circuit;

the plurality of first lines have a portion under the sealant where the width thereof is increased;

a plurality of second lines having a width smaller than that of each of the plurality of auxiliary lines may be provided at intervals greater than the width in the same layer as the auxiliary lines such that they extend across the sealant thereunder;

the plurality of second lines may include extensions of the other of group of lines, i.e., the scanning lines or signal lines forming the active matrix display circuit; and the plurality of second lines have a portion under the sealant where the width thereof is increased.

In the above-described configuration, the extensions of either the scanning lines or signal lines forming the active matrix circuit may be provided in a face-to-face relationship with the adjustment layer provided in a layer different from that of either the scanning lines or signal lines.

Further, the adjustment layer may have a region under the sealant in a face-to-face relationship with the extension of either the scanning lines or signal lines, which is electrically separated from adjacent regions.

Furthermore, the adjustment layer may be electrically divided into a plurality of segments in the region in a face-to-face relationship with the extensions of either the scanning lines or signal lines.

The extensions of the other group of lines, i.e., either the scanning lines or signal lines forming the active matrix display circuit may be provided in a face-to-face relationship with an adjustment layer provided in a layer different from that of the other group of lines, i.e., the scanning lines or signal lines.

In addition, the adjustment layer may have a region facing the extension of either the scanning lines or signal lines, which is electrically separated from adjacent regions.

Moreover, the adjustment layer may be electrically divided into a plurality of segments in the region facing the extensions of either the scanning lines or signal lines.

According to the principle of the present invention, regions under a sealant are adjusted to a height similar to that of the highest region under the sealant.

BRIEF DESCRIPTION OF THE DRAWINGS

FIG. 1 shows a configuration of an embodiment of the present invention.

FIGS. 2A and 2B show the configuration of the embodiment of the present invention.

FIGS. 4A and 4B show a configuration of still another embodiment of the present invention.

FIG. 5 shows a configuration of still another embodiment of the present invention.

FIGS. 6A and 6B show the configuration of the embodiment of the present invention.

FIGS. 7A and 7B show the configuration of the embodiment of the present invention.

FIGS. 8A and 8B show the configuration of the embodiment of the present invention.

FIGS. 9A and 9B show a configuration of still another embodiment of the present invention.

FIGS. 10A and 10B show a configuration of still another embodiment of the present invention.

FIGS. 11A and 11B show a configuration of still another embodiment of the present invention.

FIG. 12 shows a configuration of still another embodiment of the present invention.

DETAILED DESCRIPTION OF PREFERRED EMBODIMENTS

Figure 3A:
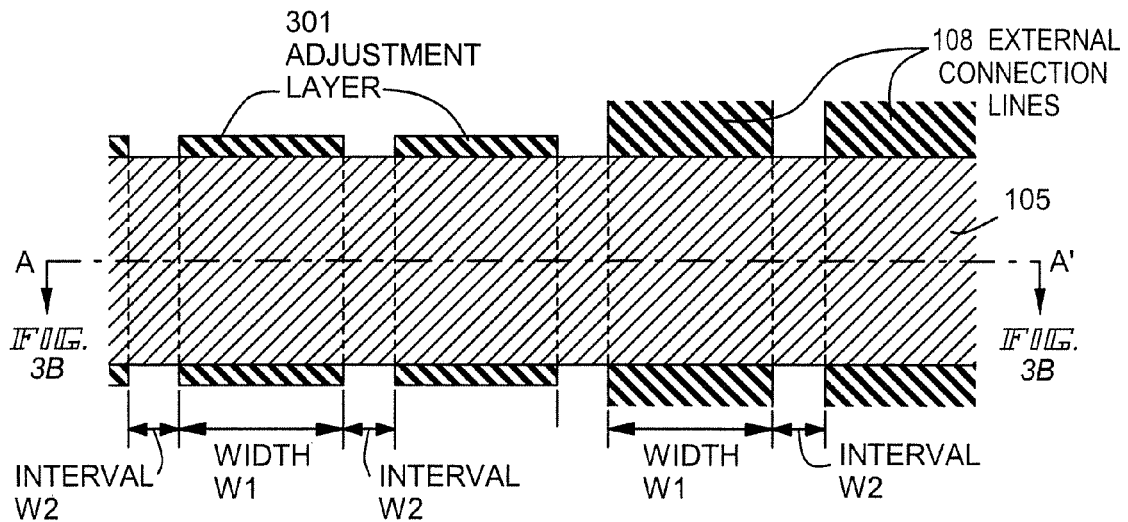
FIGS. 3A and 3B show a configuration of another embodiment of the present invention.

Preferred embodiments of the present invention will now be described with reference to the accompanying drawings.

EXAMPLE 1

The present embodiment refers to an example of flattening of a sealant region to eliminate a height difference in a configuration wherein external connection lines are provided under the sealant region.

FIG. 1 shows a configuration of an active matrix display circuit according to the present embodiment.

Referring to FIG. 1, a substrate 101 and a counter substrate 102 are disposed in a face-to-face relationship with a sealant 105 having an injection hole 110 interposed therebetween to form a panel. Provided on the substrate 101 are an active matrix display circuit 103, peripheral driving circuits 104 such as shift registers and decoders for driving the circuit 103 and external connection lines 108 for electrically connecting those circuits to circuits (not shown) outside the sealant to transmit signals therebetween. The external connection lines 108 are connected to the external circuits through an FPC (flexible printed circuit). Both of the active matrix circuit and the driving circuit may be formed on the substrate using thin film transistors as disclosed by a pending application Ser. No. 08/879,583 (filed on Jun. 20, 1997) for example. The entire disclosure of the application Ser. No. 08/879,583 is incorporated herein by reference.

Referring again to FIG. 1, the peripheral driving circuits 104 have a redundant configuration wherein two driving circuits are provided for each of signal lines and scanning lines.

In FIG. 1, there is provided an adjustment layer 106 which extends along the sealant 105 in continuation to the region under the sealant 105 with an inter-layer film (not shown) interposed in the same layer as that of the external connection lines but in a region where the external connection lines 108 are not present.

FIG. 2A shows an enlarged view of the region A 109 in FIG. 1, and FIG. 2B shows a sectional view taken along the line A-A' in FIG. 2A.

Referring to FIG. 2A, a plurality of external connection lines 109 having a predetermined width w1 are provided in a concentrated group at predetermined intervals w2. According to the present embodiment, the width w1 is in the range from 50 μm to 300 μm and is 200 μm for example. The intervals w2 are in the range from 30 μm to 100 μm and is 50 μm here.

Referring to FIG. 2B, a first inter-layer film 112 and a resin inter-layer film 113 are provided on the substrate 101 made of glass, quartz, silicon wafer or the like with an underlying film 111 constituted by a silicon oxide film or the like interposed therebetween, and a sealant 105 is provided thereon. An orientation film (not shown) may be provided between the sealant 105 and the resin inter-layer film 113.

As apparent from FIG. 2B, the external connection lines 108 and an adjustment layer 106 are formed between the first inter-layer film 112 and resin inter-layer film 113 in the same layer and using the same material such as aluminum. Therefore, the adjustment layer 106 has the same thickness (height) as the external connection lines 108 such that regions under the inter-layer film 113 where the external connection lines 108 are not present have the same height as the external connection lines 108.

Such a configuration reduces the difference in height between a region having the external connection lines 108 and a region having no external connection line on the upper surface of the resin inter-layer film 113 under the region where the sealant 105 is provided. This also reduces distortion of the counter substrate when it is put together. Further, uniform display without variation can be achieved in one screen.

While the adjustment layer 106 has a configuration like a continuous lines, the external connection lines have intervals w2. As a result, a height difference can occur because the region including the external connection lines 108 in the region under the sealant 105 is slightly lower than the region where the adjustment layer 106 is provided. However, since the width w1 of the external connection lines 108 is sufficiently greater than the intervals w1 between the lines, such a height difference is quite small and does not cause uneven display.

The external connection lines 108 and the adjustment layer 106 may be provided in a layer different from that of the signal lines (source lines) of the TFTs forming the active matrix display circuit and peripheral driving circuits, although they are in the same layer in the configuration of the present embodiment.

The external connection lines 108 and adjustment layer 106 may be provided in different layers with the same thickness, which is still similarly effective as providing them in the same layer. For example, the adjustment layer 106 may be provided under the first inter-layer film 112, and the external connection lines 108 may be provided above the first inter-layer film 112. Alternatively, their positions may be reversed. When the external connection lines 108 and adjustment layer 106 are provided in the same layer, it is easier to predict and control the height difference under the sealant region at a designing phase.

The first inter-layer film 112 may be a silicon oxide film, a silicon nitride film or a multi-layer film which is a combination thereof. The resin inter-layer film 113 is made of organic resin such as acrylic or polyimide and is formed through deposition using a spin coating process or the like.

When the adjustment layer 106 is fabricated at a step different from those for other lines in the same layer, more fine adjustment of a height difference can be carried out, though the number of steps increases.

While the adjustment layer 106 is provided with a width (the size in the transverse direction of the sealant) greater than that of the sealant 105 along the sealant 105 in the present embodiment, the width may be smaller than that of the sealant 105. Further, it is not essential to provide the adjustment layer 106 along the sealant 105, and it may be provided in any position under the region where the sealant is provided as long as the height difference is reduced.

Although the adjustment layer 106 is provided along the sealant 105 in the region where the injection hole 110 is provided in FIG. 1, it may be continuous even in the region where the injection hole is provided as indicated by the dotted line 120. A substantially constant electric potential can be achieved in the plane of the substrate when the adjustment 106 is provided continuously to surround the peripheral driving circuits 104 and the active matrix display circuit 103 as described above. This is true only when the adjustment layer 106 has conductivity.

The use of an insulating substrate made of glass, quartz or the like is liable to cause localization of electrostatic charges in the plane of the substrate. As a result, electrostatic breakdown of TFTs may be caused by localized electrostatic charges during a rubbing step. A substantially constant electric potential can be established in the plane of the substrate by forming the adjustment layer 106 continuously such that it surrounds the peripheral driving circuits 104 and active matrix display circuit 103 to prevent such electrostatic breakdown.

Stripes attributable to the rubbing step sometimes appear on a finished liquid crystal display. By forming a continuous adjustment layer 106 as described above, such stripes due to rubbing are advantageously reduced on the display, although the reason is unknown.

When the adjustment layer 106 is continuously formed as described above, the position of the injection hole 110 is not limited by the shape of the adjustment layer 106, and the hole may be provided in any position. However, the height of the path extending from the injection hole 110 to the interior of the sealant region may be increased because of the presence of the adjustment layer 106, resulting in an increase in the time required for injecting liquid crystal. In other words, the liquid crystal injection time can be reduced by forming the adjustment layer 106 in compliance with the shape of the injection hole 110 as shown in FIG. 10 to make the opening area of the injection hole larger.

While it is not possible to form the adjustment layer 106 such that it continuously extend to surround the substrate 101 completely because of the presence of the external connection lines 108, it can still provide the effect of establishing a substantially constant electric potential in the plane of the substrate even if it is not completely continuous. A more constant electric potential can be achieved by, for example, forming the adjustment layer 106 in the configuration shown in FIGS. 1, 2A and 2B and providing conductive lines extending along the periphery of the substrate to establish a constant electric potential in a layer separate from the adjustment layer 106, e.g., under the first inter-layer film 112 shown in FIG. 2B.

While the external connection lines 108 and adjustment layer 106 are provided under the resin inter-layer film 113, i.e., provided in the layer above the first inter-layer film 112 in the first embodiment, they may alternatively be provided under the first inter-layer film 112.

EXAMPLE 2

Figure 3B:
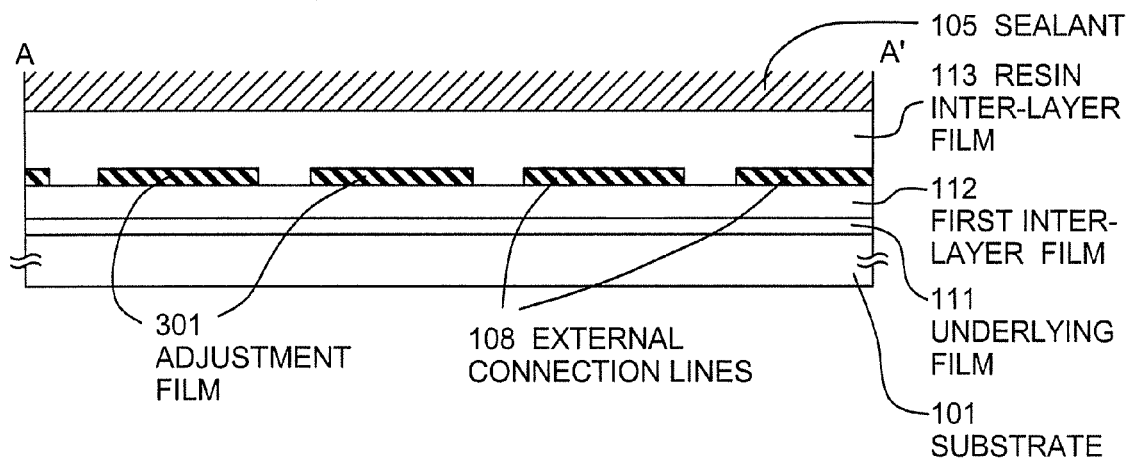
Figure 13:
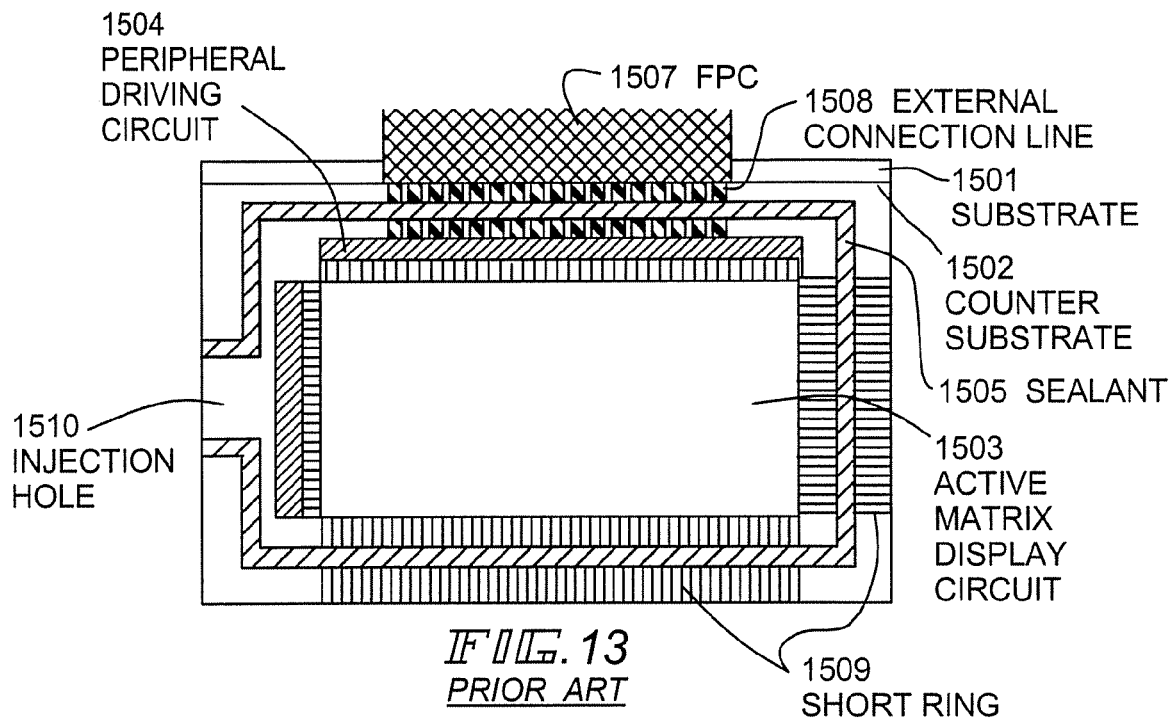
FIG. 13 shows a configuration of an example of a liquid crystal panel.
Figure 14A:
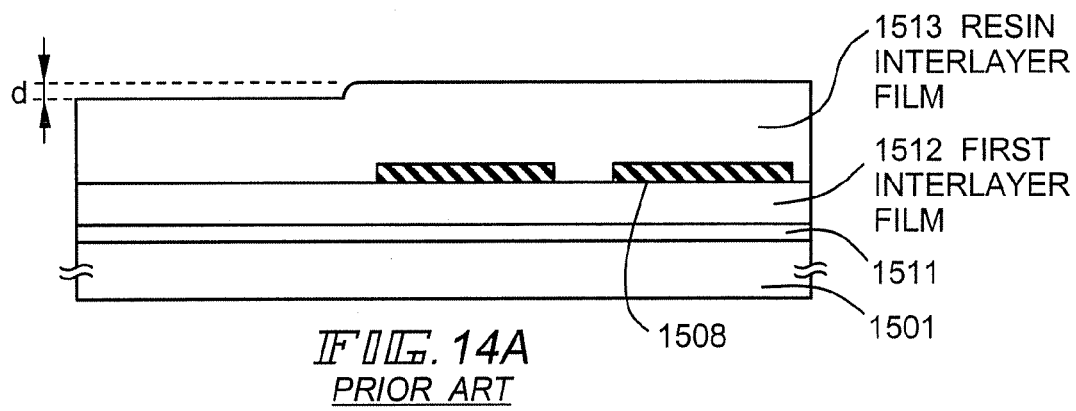
FIGS. 14A and 14B show the cross section of the liquid crystal panel of FIG. 13.
Figure 14B:
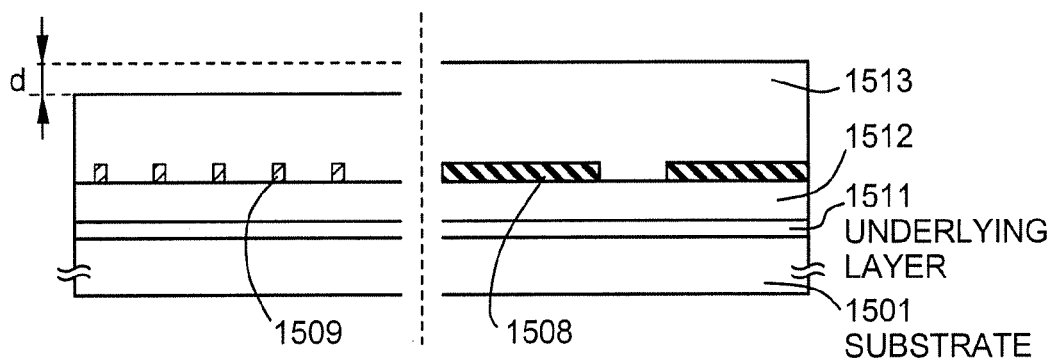

The second embodiment refers to another configuration of the adjustment layer 106 according to the first embodiment. FIGS. 3A and 3B show the configuration of an adjustment layer 301 according to the present embodiment.

Referring to FIG. 3A, the adjustment layer 301 has the same width w1 as the external connection lines 108 and is formed in sections at intervals w2 instead of being formed continuously as the adjustment layer 106 of the first embodiment. Specifically, a region having the external connection lines 108 and a region having the adjustment layer 301 have the same structure under the sealant 105.

In such a configuration, the height of the resin inter-layer film 112 can be kept substantially equal between the region having the external connection lines 108 and the region having the adjustment layer 301. This makes it possible to make the region under the sealant 105 flatter and to therefore achieve a more uniform height compared to the configuration according to the first embodiment. Therefore, the distortion of the counter substrate 102 is minimized to allow preferable display having quite high uniformity in the screen and less variation.

EXAMPLE 3

The third embodiment refers to an alternative to the configuration described as the first embodiment, in which the resistance of the external connection lines is reduced. FIGS. 4A and 4B show a configuration according to the third embodiment.

FIG. 4A is a schematic sectional view taken along the line X-X' in FIG. 1 illustrating the application of the configuration of the third embodiment to the configuration of the first embodiment.

While the external connection lines are provided between the first inter-layer film 112 and resin inter-layer film 113 in the first embodiment, according to the third embodiment, auxiliary lines 401 that extend along external connection lines 403 are provided under the first inter-layer film 112 and the external connection lines 403 and auxiliary lines 401 are electrically connected in parallel by forming contact holes in the first inter-layer film 112 to reduce the electrical resistance as shown in FIG. 4A. The auxiliary lines 401 may be formed in other layers to reduce electrical resistance further.

Referring to FIG. 4A, the external connection lines 403 are electrically connected to an FPC (flexible printed circuit) 107 through contact holes provided in the resin inter-layer film 113 through an ITO (indium tin oxide) film 114. In the present embodiment, the ITO film 114 is fabricated at the same step as for an ITO film that forms pixel electrodes connected to the TFTs of the active matrix display circuit. The ITO film 114 is electrically connected to external circuits through the FPC 107.

Among signals applied to the external connection lines 403 from the external circuits, clock and video signals have very high frequencies. An active matrix liquid crystal display device has a large area for display, lines forming its circuit inevitably have a length of several centimeters or more. However, since the lines themselves have only a thickness in the range from a few hundred nm to 700 nm, the lines as a whole have high electric resistance even if a metal such as aluminum having high conductivity is used as the line material. A high line resistance causes delay and deterioration of the propagation of high frequency signals such as clock and video signals to disallow preferable display.

The configuration described in the present embodiment makes it possible to reduce electrical resistance of the external connection lines 403 significantly to allow an active matrix liquid crystal display integral with peripheral driving circuits, to provide preferable display when driven at a high frequency and a high speed.

However, in such a configuration wherein a plurality of lines provided in different layers are connected in parallel, a height difference between a region under the sealant including the lines and a region including no line will be greater than that in a case where those lines are formed only in one layer.

That is, preferable display can not be achieved due to the increased height difference in the region under the sealant, though electric resistance is reduced.

In the configuration according to the present embodiment, ant adjustment layer having the same thickness (height) as the auxiliary lines 401 is provided in the same layer as the auxiliary lines 401 provided in order to reduce electric resistance, and the auxiliary lines 401 and a first adjustment layer 402 are provided in a layer under the first inter-layer film 112. Like the first embodiment, the external connection lines 403 and a second adjustment layer 404 are provided above the first inter-layer film 112, i.e., under the resin inter-layer film 113.

In such a configuration wherein auxiliary lines 401 are provided to reduce electrical resistance, the height difference under the sealant region can be reduced, and uniform display can be achieved in one screen without variation.

In the present embodiment, either or both of the first adjustment layer 402 and the second adjustment layer 404 may be configured to have the same width and intervals as those of the external connection lines 403 as shown in the second embodiment. Such a configuration makes it possible to reduce the height difference under the sealant region further to achieve higher uniformity. In this case, when the auxiliary lines 401 and external connection lines 403 have different widths and intervals, the first adjustment layer 402 and second adjustment layer 404 may be formed such that they respectively have the same widths and intervals as the auxiliary lines 401 and external connection lines 403 to reduce the height difference under the sealant region for higher uniformity, thereby allowing preferable display.

In the present embodiment, the auxiliary lines and external connection lines may be replaced with each other to use the lines provided in the layer under the first inter-layer film as external connection lines which establish electrical connection with the FPC.

EXAMPLE 4

The fourth embodiment refers to a configuration wherein a height difference under the sealant region is reduced to achieve a uniform height in case where lines having different widths and intervals are present in the same layer. FIG. 5 shows a configuration of an active matrix liquid crystal display device according to the fourth embodiment. In FIG. 5, reference numbers same as those appear in FIG. 1 indicate like elements.

Referring to FIG. 5, an active matrix display circuit 103 is different from that shown in FIG. 1 in that one peripheral driving circuit 509 such as a shift register or decoder for driving the active matrix display circuit 103 is provided for driving each of the signal lines and scanning lines.

There is provided scanning line short rings 503 which are extensions of the scanning lines and signal line short rings 504 which are extensions of the signal lines on the sides where the peripheral driving circuit 509 is not provided. The short rings 503 and 504 are electrically connected to each other until the substrate is divided into panels at a multi-shot production step to provide a function of preventing the electrostatic breakdown of the TFTs forming the active matrix display circuit 103 at steps where static electricity can occur such as the rubbing step.

Since the short rings 503 and 504 are extensions of the scanning lines and signal lines respectively, the widths and intervals of those lines (a short ring is also described as a line in this specification, although it does not transmit any electric signal in a liquid crystal display device) also the same as those of the scanning lines and signal lines. Therefore, the lines have a width in the range from 2 µm to 10 µm and an interval in the range from about 20 µm to about 100 µm which is equal to the pitch of the pixels. Those values obviously change depending on the application. In general, the scanning line short rings 503 and signal line short rings 504 are respectively connected to the gates and sources of the TFTs forming the active matrix display circuit 103.

It would be noted here that the line intervals of the short rings 503 and 504 are very much larger than the widths of those lines. This is quite contrary to the external connection lines 108.

FIG. 6A shows an enlarged view of the region B 505 in FIG. 5, and FIG. 6B shows a section taken along the line B-B' in FIG. 6A.

FIG. 7A shows an enlarged view of the region C 506 in FIG. 5, and FIG. 7B shows a section taken along the line C-C' in FIG. 7A. FIG. 8A shows an enlarged view of the region D 507 in FIG. 5, and FIG. 8B shows a section taken alone the line D-D' in FIG. 8A.

As shown in FIG. 6A, a plurality of external connection lines 108 having a predetermined width w1 at predetermined intervals w2 are provided as a croup in a concentrated fashion. The width w1 is in the range from 50 µm to 300 µm, e.g., 200 µm, and the interval w2 is in the range from 30 µm to 100 µm, e.g., 50 µm, in the present embodiment.

As shown in FIG. 6B, a first inter-layer film 112 and a resin inter-layer film 113 are provided on a substrate 101 made of glass, quartz, silicon wafer or the like with an underlying film 111 constituted by a silicon oxide film or the like interposed therebetween, and a sealant 105 is provided thereon. An orientation film (not shown) may be provided between the sealant 105 and the resin inter-layer film 113.

As apparent from FIG. 6B, a first adjustment layer 501 is provided between the underlying film 111 and first inter-layer film 112. This will be described later in more detail.

As apparent from FIG. 6B, external connection lines 108 and a second adjustment layer 502 are formed in the same layer from the same material, e.g., aluminum between the first inter-layer film 112 and the resin inter-layer film 113 under the sealant 105.

Therefore, the second adjustment layer 502 has the same thickness (height) as the external connection lines 108 such that a region where the external connection lines 108 are not provided under the resin inter-layer film 113 has the same height as the external connection lines 108.

Such a configuration reduces the height difference between the region having the external connection lines 108 and the region having no external connection lines on the upper surface of the resin inter-layer film 113 under the region where the sealant 105 is provided. As a result, distortion of the counter substrate is reduced when it is put together.

While the second adjustment layer 502 has a configuration that seems like a continuous line, the external connection lines 108 has the intervals w2. Therefore, the region above the resin inter-layer film 113 and under the sealant where the external connection lines 108 are provided is slightly lower than the region where the second adjustment layer 502 is provided, which may cause a height difference. However, since the width w1 of the external connection lines 108 is sufficiently greater than the interval w2 thereof, the height difference is quite small. The present embodiment is similar to the first embodiment up to this point.

Next, as shown in FIG. 7A which is an enlarged view of the region C 506, the present embodiment includes a signal line short ring 504 provided in the same layer as the external connection lines 108 and second adjustment layer 502.

The signal line short ring 504 has a width w3 and an interval w4 in general but has a width w5 greater than the width w3 and an interval w6 smaller than the interval w5 in the region under the sealant 105. The width w5 is preferably greater than the interval w6. Preferably, the width w5 is as large as possible.

In such a configuration a height difference on the upper surface of the resin inter-layer film 113 in the region under the sealant 105 can be reduced between the region where a plurality of signal short rings 504 are provided as a group and the region where the plurality of external connection lines 108 are provided as a group.

In other words, in such a configuration, the ratio in a unit area of the region having the short rings 504 to the region having no short ring in the region where the plurality of signal short rings 504 are provided as a group under the sealant 105 is made as close as possible to the ratio in the unit area of the region having the external connection lines 108 to the region having no external connection line in the region where the plurality of external connection lines 108 are provided as a group.

Next, as shown in FIG. 8A which is an enlarged view of the region D 507 and FIG. 8B which is a section taken along the line D-D' thereof, the first adjustment layer 501 is provided in the same layer as the scanning line short rings 503 as has the same thickness (height). The scanning line short rings 503 and the first inter-layer film 501 are formed with the same width w3 and interval w4. That is, in the present embodiment, the first adjustment layer 501 is the same as the scanning line short rings 503 except that it has a different line length.

In such a configuration, a height difference on the upper surface of the first inter-layer film 112 in the region under the sealant 105 can be reduced between the region having the scanning line short rings 503 and the region having no scanning line short ring to achieve a uniform height. That is, the formation of the short rings 503 substantially causes no problem associated with the height difference on the first inter-layer film 112 under the sealant 105.

Since the line interval w4 of the scanning line short rings 503 is very much greater than the line width w3 thereof, when the first adjustment layer 501 has a continuous configuration like that of the adjustment layer 106 in the first embodiment, the upper surface of the first inter-layer film 112 will be higher in the region having the scanning line short rings 503 than in the region having first adjustment layer 501.

According to the present embodiment, the fabrication of the second adjustment layer 502 in a step different from those for other lines in the same layer will allow finer adjustment of the height difference, although the number of steps will increase.

While the first adjustment layer 501 and second adjustment layer 502 in the present embodiment are provided along the sealant 105 with a width greater than that of the sealant 105 (the size in the transverse direction of the sealant), they may be smaller than the sealant in width. Further, it is not essential to provide them along the sealant 105, and they may be provided in any position under the region where the sealant is provided as long as the height difference is reduced.

According to the present embodiment, it is advantageous to form the second adjustment layer 502 with the same configuration as the adjustment layer 106 in the second embodiment instead of a continuous configuration to reduce the height difference further.

According to the present embodiment, when the external connection lines 108 are provided in the same layer as the first adjustment layer 501 and the scanning line short rings 503, the relevant widths and intervals of the adjustment layer and short rings may be changed to those in the present embodiment.

EXAMPLE 5

The fifth embodiment shows an example wherein the configuration shown in the fourth embodiment is modified to a configuration with reduced resistance of the external connection lines 403 as shown in the third embodiment. The present embodiment employs the same configurations of the external connection lines 403 and auxiliary lines 401 as those in the third embodiment.

FIGS. 9A and 9B are an enlarged view and a section taken along the line D-D' of the region D 507 in FIG. 5, respectively, according to the present embodiment. The present embodiment is different from the fourth embodiment in that, as shown in FIGS. 9A and 9B, the scanning line short rings 503 under the first inter-layer film 112 have an increased width and decreased intervals in the region under the sealant like the signal line short rings 504 shown in FIGS. 7A and 7B according to the fourth embodiment (The sealant 105 is as shown in the drawings described so far although not shown in FIG. 9A).

The reason for the above-described configuration is that a height difference on the upper surface of the resin inter-layer film 113 in the region under the sealant 105 can be reduced between the region where a plurality of scanning line short rings 503 are provided as a group and the region where a plurality of auxiliary lines 401 for the external connection lines 403 are provided as a group.

EXAMPLE 6

The sixth embodiment shows a configuration wherein capacitance between short rings and an adjustment layer is reduced in a region where they face each other.

FIGS. 10A and 10B are an enlarged view and a sectional view taken along the line D-D' of the region D 507 in FIG. 5 according to the present embodiment.

In FIG. 9A associated with the fifth embodiment, the second adjustment layer 502 faces the scanning line short rings 503 in electrical and physical continuity thereto. The first inter-layer film 112 is present between them. Since the first inter-layer film 112 is an insulating film constituted by a silicon oxide film, a silicon nitride film or a multi-layer film consisting thereof, capacitance is formed between the scanning line short rings 503 and the second adjustment layer 502 because the second adjustment layer 502 is a conductor. However, since the scanning line short rings 503 are extensions of the scanning lines of the active matrix display circuit 103, the presence of the above-described capacitance increases the load required to drive the scanning lines, adversely affecting the display.

In order to solve such a problem, according to the present embodiment, the second adjustment layer 502 is divided into independent segments in electrical isolation from each other in positions where they face respective scanning line short rings 503 as shown in FIGS. 10A and 10B. Specifically, the second adjustment layer 502 is divided into segments having substantially the same configuration as the scanning line short rings 503 in positions where they face the respective scanning line short rings 503. As a result, the capacitance can be reduced without increasing the height difference under the sealant.

Such a configuration can be applied to the first adjustment layer 501 facing the signal line short rings 504 to achieve the same effect.

Further, such a configuration may be applied to the configuration according to the fourth embodiment where the width of the scanning line short rings 503 is not increased, though the effect is somewhat reduced.

EXAMPLE 7

The seventh embodiment is an alternative to the configuration according to the sixth embodiment. A configuration according to the seventh embodiment is shown in FIGS. 11A and 11B. In the present embodiment, a scanning line short ring 503 is shaped such that its area varies in the transverse direction of the sealant. Such a configuration is also effective in reducing capacitance without increasing the height difference under the sealant.

Such a configuration may be applied to the first adjustment layer 501 that faces the signal line short rings 504 to achieve the same effect.

EXAMPLE 8

The eighth embodiment shows an alternative to the configurations according to the sixth and seventh embodiments. A configuration according to the eighth embodiment is shown in FIG. 12.

Although the configurations according to the sixth and seven embodiments are effective in reducing capacitance, when one scanning line short ring 503 is shorted with the second adjustment layer 502 by a spacer or the like which penetrates through the resin inter-layer film because of a pressure applied thereto, the short ring will have capacitance which is different in magnitude from those of other scanning line short rings. As a result, shorted line will have a driving load different from those of other scanning lines and have different display characteristics.

According to the eighth embodiment, a region of the second adjustment layer 502 that faces one scanning line short ring 503 is further divided into a plurality of segments. As a result, even when one of the plurality of divided second adjustment layers 502 facing one scanning line short ring 503 is shorted, the second adjustment layers 502 are not shorted as a whole, and the difference is capacity from those of other scanning line short rings 503 can be suppressed to suppress variations and differences in display characteristics.

EXAMPLE 9

The present embodiment refers to products utilizing active matrix liquid crystal display devices as described in the above embodiments. Electronic apparatuses that may embody the invention include video cameras, still cameras, projectors, head mount displays, car navigation systems, personal computers, personal digital assistants (mobile computers and cellular mobile phones) and the like. FIGS. 15A through 15F are schematic external views of electronic apparatuses according to the present embodiment.

Figure 15A:
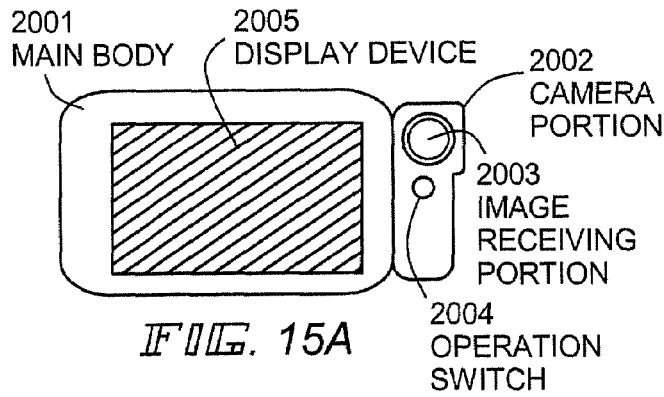
FIGS. 15A through 15F show examples of the application of the present invention.

FIG. 15A shows a mobile computer which is constituted by a main body 2001, a camera portion 2002, an image-receiving portion 2003, operation switches 2004 and a liquid crystal display device 2005.

Figure 15B:
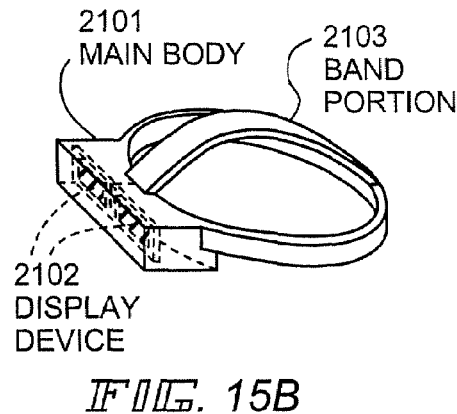

FIG. 15B shows a head mount display which is constituted by a main body 2101, a pair of liquid crystal display devices 2102 and a band portion 2103 for securing the main body on the head of a person. The pair of liquid crystal display devices display images for the left and right eyes, respectively. The user gets visual perception of the images through an optical system. Then, the user get visual perception which seems like a large screen spreading in front of his or her eyes.

Figure 15C:
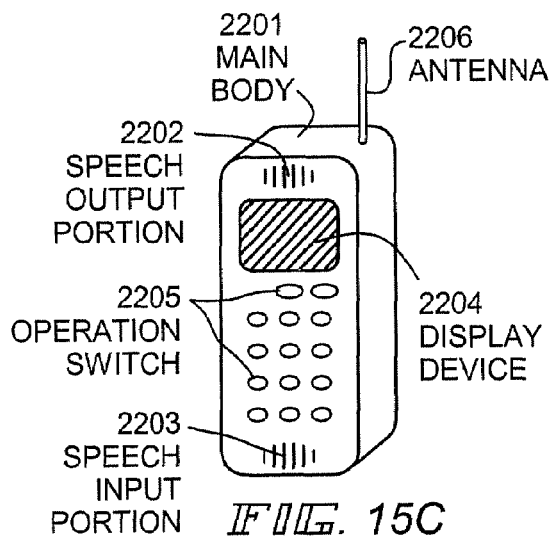

FIG. 15C shows a cellular mobile phone which is constituted by a main body 2201, a speech output portion 2202, a speech input portion 2202, a liquid crystal display device 2204, operation switches 2205 and an antenna 2206.

Figure 15D:
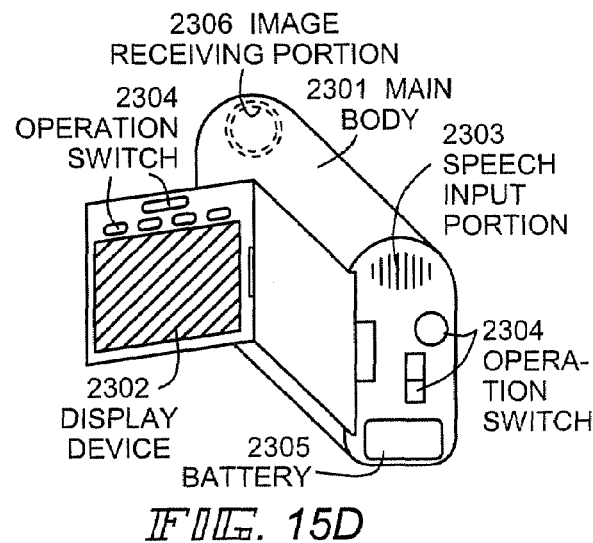

FIG. 15D shows a video camera which is constituted by a main body 2301, a reflection type liquid crystal display device 2302, a speech input portion 2303, operation switches 2304, a battery 2305 and an image-receiving portion 2306.

Figure 15E:
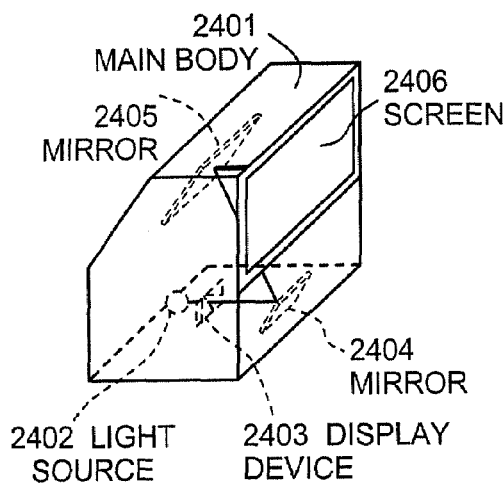

FIG. 15E shows a rear type projector in which light emitted by a light source 2402 provided in a main body 2401 is reflected and modulated by a pixel portion in a reflection type liquid crystal display device 2403. The reflected light is projected through a mirror 2404 and 2405 upon a screen 2406 to be displayed thereon as an image.

Figure 15F:
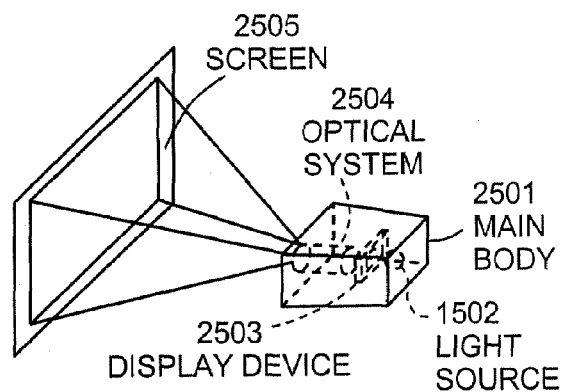

FIG. 15F shows a front type projector in which light emitted by a light source 2502 in a main body 2501 is modulated and transmitted by a transmission type liquid crystal display device 2503. The transmitted light is projected by an optical system 2504 upon a screen 2505 to display an image thereon.

The invention disclosed in this specification makes it possible to reduce a height difference in a sealant region when lines are present under the sealant region, thereby allowing distortion of a counter substrate to be eliminated and allowing a liquid crystal display device having excellent uniformity of display in a screen to be provided.

What is claimed is:

1. An electronic apparatus comprising:
   a first wiring over a substrate;
   an insulating film over said first wiring;
   a second wiring over said insulating film;
   a sealant over said insulating film and second wiring;
   a transparent conductive layer over said second wiring; and
   a flexible printed circuit over said transparent conductive layer,
   wherein said first wiring is at least partially overlapped with said second wiring,
   wherein said first wiring is electrically connected to said second wiring,
   wherein said second wiring is electrically connected to said flexible printed circuit through said transparent conductive layer, and
   wherein the transparent conductive layer does not overlap the sealant.

2. An electronic apparatus according to claim 1, wherein said first wiring comprises aluminum.

3. An electronic apparatus according to claim 1, wherein said transparent conductive layer comprises indium tin oxide.

4. An electronic apparatus comprising:
   a first wiring over a substrate;
   an insulating film over said first wiring;
   a second wiring over said insulating film;
   a sealant over said insulating film and second wiring;

a transparent conductive layer over said second wiring; and
a flexible printed circuit over said transparent conductive layer,
wherein said first wiring is at least partially parallel with said second wiring,
wherein said first wiring is electrically connected to said second wiring,
wherein said second wiring is electrically connected to said flexible printed circuit through said transparent conductive layer, and
wherein the transparent conductive layer does not overlap the sealant.

5. An electronic apparatus according to claim 4, wherein said first wiring comprises aluminum.

6. An electronic apparatus according to claim 4, wherein said transparent conductive layer comprises indium tin oxide.

7. An electronic apparatus comprising:
a first wiring over a substrate;
a first insulating film over said first wiring;
a second wiring over said first insulating film;
a second insulating film over said first insulating film and second wiring;
a transparent conductive layer over said second wiring and said second insulating film; and
a flexible printed circuit over said transparent conductive layer,
wherein said first wiring is at least partially overlapped with said second wiring,
wherein said first wiring is electrically connected to said second wiring, and
wherein said second wiring is electrically connected to said flexible printed circuit through said transparent conductive layer.

8. An electronic apparatus according to claim 7, wherein said second insulating film is in contact with said transparent conductive layer.

9. An electronic apparatus according to claim 7, wherein said second insulating film comprises a material selected from the group consisting of acryl and polyimide.

10. An electronic apparatus according to claim 7, wherein said first wiring comprises aluminum.

11. An electronic apparatus according to claim 7, wherein said transparent conductive layer comprises indium tin oxide.

12. An electronic apparatus comprising:
a first wiring over a substrate;
a first insulating film over said first wiring;
a second wiring over said first insulating film;
a second insulating film over said first insulating film and second wiring;
a transparent conductive layer over said second wiring and said second insulating film; and
a flexible printed circuit over said transparent conductive layer,
wherein said first wiring is at least partially parallel with said second wiring,
wherein said first wiring is electrically connected to said second wiring, and
wherein said second wiring is electrically connected to said flexible printed circuit through said transparent conductive layer.

13. An electronic apparatus according to claim 12, wherein said second insulating film is in contact with said transparent conductive layer.

14. An electronic apparatus according to claim 12, wherein said second insulating film comprises a material selected from the group consisting of acryl and polyimide.

15. An electronic apparatus according to claim 12, wherein said first wiring comprises aluminum.

16. An electronic apparatus according to claim 12, wherein said transparent conductive layer comprises indium tin oxide.

17. An electronic apparatus comprising:
a first wiring over a substrate;
a first insulating film over said first wiring;
a second wiring over said first insulating film;
a second insulating film over said first insulating film and second wiring;
a sealant over said first insulating film and second wiring and on said second insulating film;
a transparent conductive layer over said second wiring and said second insulating film; and
a flexible printed circuit over said transparent conductive layer,
wherein said first wiring is at least partially overlapped with said second wiring,
wherein said first wiring is electrically connected to said second wiring,
wherein said second wiring is electrically connected to said flexible printed circuit through said transparent conductive layer, and
wherein the transparent conductive layer does not overlap the sealant.

18. An electronic apparatus according to claim 17, wherein said second insulating film is in contact with said transparent conductive layer.

19. An electronic apparatus according to claim 17, wherein said second insulating film comprises a material selected from the group consisting of acryl and polyimide.

20. An electronic apparatus according to claim 17, wherein said first wiring comprises aluminum.

21. An electronic apparatus according to claim 17, wherein said transparent conductive layer comprises indium tin oxide.

22. An electronic apparatus comprising:
a first wiring over a substrate;
a first insulating film over said first wiring;
a second wiring over said first insulating film;
a second insulating film over said first insulating film and second wiring;
a sealant over said first insulating film and second wiring and on said second insulating film;
a transparent conductive layer over said second wiring and said second insulating film; and
a flexible printed circuit over said transparent conductive layer,
wherein said first wiring is at least partially parallel with said second wiring,
wherein said first wiring is electrically connected to said second wiring,
wherein said second wiring is electrically connected to said flexible printed circuit through said transparent conductive layer, and
wherein the transparent conductive layer does not overlap the sealant.

23. An electronic apparatus according to claim 22, wherein said second insulating film is in contact with said transparent conductive layer.

24. An electronic apparatus according to claim 22, wherein said second insulating film comprises a material selected from the group consisting of acryl and polyimide.

25. An electronic apparatus according to claim 22, wherein said first wiring comprises aluminum.

26. An electronic apparatus according to claim 22, wherein said transparent conductive layer comprises indium tin oxide.

* * * * *